(12) United States Patent
Krenz et al.

(10) Patent No.: US 8,773,101 B2
(45) Date of Patent: Jul. 8, 2014

(54) POWER MANAGEMENT FOR LOADS SUPPLIED WITH POWER FROM WILD SOURCES

(75) Inventors: Michael Krenz, Roscoe, IL (US); Carl A. Wagner, Beloit, WI (US); Todd A. Spierling, Byron, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 216 days.

(21) Appl. No.: 13/197,954

(22) Filed: Aug. 4, 2011

(65) Prior Publication Data
US 2013/0033246 A1    Feb. 7, 2013

(51) Int. Cl.
*G05F 1/00*    (2006.01)

(52) U.S. Cl.
USPC .......................................... 323/285; 323/282

(58) Field of Classification Search
USPC .................. 323/271–277, 282–285, 222–225
See application file for complete search history.

(56) References Cited

U.S. PATENT DOCUMENTS

| | | | | |
|---|---|---|---|---|
| 4,888,493 A * | 12/1989 | Fluegel | 290/4 C |
| 4,908,565 A * | 3/1990 | Cook et al. | 322/10 |
| 4,937,720 A * | 6/1990 | Kirchberg | 363/41 |
| 4,977,492 A * | 12/1990 | Kirchberg et al. | 363/41 |
| 5,075,839 A * | 12/1991 | Fisher et al. | 363/48 |
| 5,550,463 A * | 8/1996 | Coveley | 323/300 |
| 7,038,435 B2 * | 5/2006 | Ortiz et al. | 323/282 |
| 7,902,802 B2 * | 3/2011 | Lo et al. | 323/273 |
| 2004/0150380 A1* | 8/2004 | Santin et al. | 323/283 |
| 2007/0035284 A1* | 2/2007 | Schoofs et al. | 323/283 |
| 2007/0103004 A1* | 5/2007 | Chou et al. | 307/64 |
| 2008/0084196 A1 | 4/2008 | Lacombe et al. | |
| 2008/0238386 A1* | 10/2008 | Kagan | 323/282 |
| 2008/0315852 A1* | 12/2008 | Jayaraman et al. | 323/285 |
| 2009/0179626 A1 | 7/2009 | Smith et al. | |
| 2009/0237052 A1* | 9/2009 | Takasu et al. | 323/282 |
| 2010/0164450 A1* | 7/2010 | Dishman et al. | 323/282 |
| 2010/0232082 A1* | 9/2010 | Seger | 361/211 |
| 2011/0089921 A1* | 4/2011 | Tomita et al. | 323/284 |
| 2012/0153920 A1* | 6/2012 | Guenther et al. | 323/285 |
| 2012/0212065 A1* | 8/2012 | Cheng et al. | 307/82 |
| 2013/0002031 A1* | 1/2013 | Mulkey et al. | 307/82 |
| 2013/0026842 A1* | 1/2013 | Arditi et al. | 307/82 |

OTHER PUBLICATIONS

European Search Report dated Mar. 7, 2014 for EP12177678.5.

* cited by examiner

*Primary Examiner* — Timothy J Dole
*Assistant Examiner* — Yusef Ahmed
(74) *Attorney, Agent, or Firm* — Kinney & Lange, P.A.

(57) ABSTRACT

A solid-state power regulator (SSPR) regulates power delivered to a frequency tolerant load from a wild-source generator. The SSPR includes a solid-state switching device and a controller. The solid-state switching device is turned On to deliver power from the wild-source generator to the frequency-tolerant load and Off to prevent the delivery of power to the frequency-tolerant load. The controller monitors the power delivered to the frequency-tolerant load and selectively modulates the solid-state switching device to regulate the power delivered.

10 Claims, 3 Drawing Sheets

POWER MANAGEMENT FOR LOADS SUPPLIED WITH POWER FROM WILD SOURCES

BACKGROUND

The present invention is related to power distribution, and in particular to power distribution and management to loads from "wild" power sources.

In aircraft applications, electric power generation is derived, in large part, from mechanical power supplied by the aircraft's engines, which is converted to alternating current (AC) electric power by a generator. Variations in aircraft engine speed results in variation in the output voltage generated by the generator. However, some loads are sensitive to variations in frequency, and therefore most generators employed on modern-day aircraft provide either a constant output frequency or a variable frequency that varies within a defined range that is acceptable to attached loads. For example, constant frequency generators use mechanical couplings to provide a constant-frequency AC output despite variations in engine speed. The mechanical couplings add to the cost and weight of the generator however. Variable-frequency generators are an alternative to constant frequency generators, but must still be capable of providing an AC output within a well-defined range (e.g., 350 Hz-800 Hz). This requirement also adds to the weight and cost of variable-frequency generators.

A cheaper alternative to constant-frequency generators and variable-frequency generators is a wild-source generator that provides an AC output that varies in both frequency and voltage more than that of the variable-frequency generators. Traditionally, wild-source generators have not found applicability in aircraft applications because of their inability to provide the type of power required by most loads on the aircraft.

SUMMARY

A solid-state power regulator (SSPR) regulates power delivered to a frequency tolerant load from a wild-source power source. The SSPR includes a solid-state switching device and a controller. The solid-state switching device is turned On to deliver power from the wild-source power source to the frequency-tolerant load and Off to prevent the delivery of power to the frequency-tolerant load. The controller monitors the power delivered to the frequency-tolerant load and selectively modulates the solid-state switching device to regulate the power delivered.

DETAILED DESCRIPTION

The present invention provides a system and method of employing wild-source generators that provides an AC output that varies in voltage and frequency more than that of traditional variable-frequency generators. In particular, the present invention employs wild power sources to supply power to particular types of loads (e.g., resistive loads) that can accommodate large variations in frequency. A solid-state switching device is employed to regulate the power delivered from the wild source to a particular load to ensure the load is not overloaded or damaged. This requires the power delivered to the load to be monitored and used to regulate the On/Off time of the solid-state switch to provide the desired amount of power to the attached load.

Figure 1:
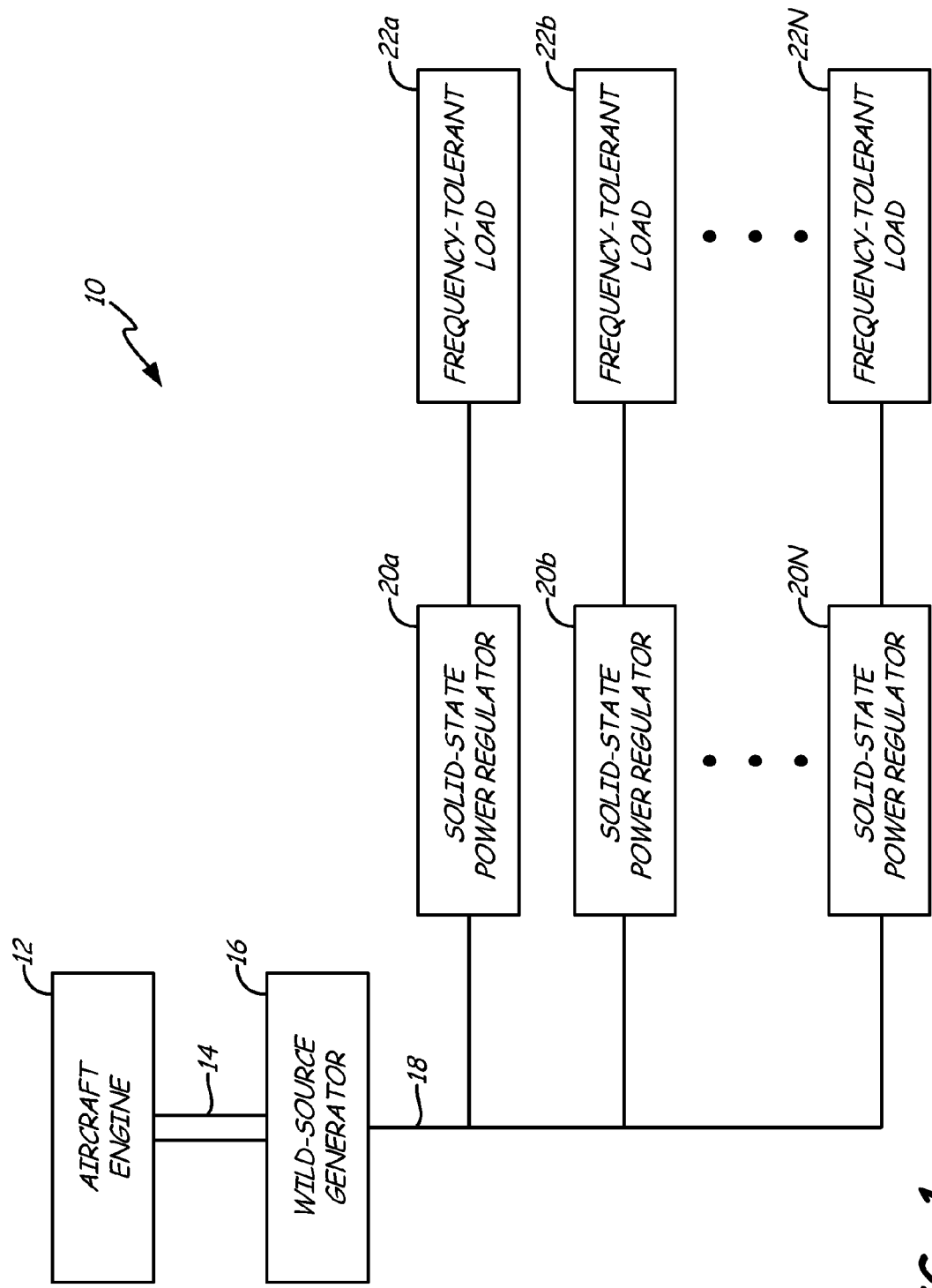
FIG. 1 is a block diagram of an electric power generation/distribution system (EPGDS) that employs "wild" sources according to an embodiment of the present invention.

FIG. 1 is a block diagram of electric power generation/distribution system (EPGDS) 10 that employs wild-source generators according to an embodiment of the present invention. EPGDS 10 includes aircraft engine 12, shaft 14, wild-source generator 16, power distribution bus 18, solid state power regulators (SSPR) 20a, 20b, ... 20N, and frequency tolerant loads 22a, 22b ... 22N.

In the embodiment shown in FIG. 1, motive power generated by aircraft engine 12 is communicated via shaft 14 to wild-source generator 16. In other embodiments, other well-known means of mounting wild-source generator 16 with respect to aircraft engine 12 to communicate mechanical energy from engine 12 to generator 16 may be employed. For example, wild-source generator 16 may receive mechanical energy via a direct drive from the shaft (not shown) of aircraft engine 12, may be mounted around aircraft engine 12 in which the shaft of the engine serves as either the stator or the rotor of the wild-source generator, via mechanical gearbox coupling, or other well-known means of communicating mechanical power from aircraft engine 12 to wild-source generator 16.

Wild-source generator 16 converts mechanical energy supplied by aircraft engine 12 to a variable frequency, variable voltage AC output for distribution to attached loads via power distribution bus 18. Wild-source generator 16 is referred to as a "wild" source generator due to the range of frequencies and voltages generated by the generator, which can be defined as a frequency range that is greater than the frequency range associated with variable-frequency generators. For example, various specifications (e.g., military specification MIL-STD-704F) define the maximum allowable range of frequencies that may be generated by a variable-frequency generator. A generator providing a frequency range greater than that defined with respect to variable-frequency generators is classified as wild-source. In one embodiment, variable-frequency generators provide an AC output in the frequency range of 350 Hz-800 Hz. A wild-source generator would therefore provide an AC output in a frequency range greater than that defined with respect to the variable-frequency generator.

Power distribution bus 18 supplies the AC output provided by wild-source generator 16 to loads 22a-22N via SSPRs 20a-20N, respectively. Each load 22a-22N is a frequency-tolerant load. For example, in aircraft applications, frequency-tolerant loads (i.e., resistive loads) include heating elements used for de-icing operations. Resistive loads operate in the same manner regardless of the frequency of the AC power with which they are supplied, and may therefore be sourced with power from wild-source generator 16. SSPRs 20a-20N control the supply of power from power distribution bus 18 to individual loads 22a-22N. In particular, each SSPR 20a-20N includes a solid-state power device selectively controlled to supply power from power distribution bus 18 to loads 22a-22N.

In addition, SSPRs 20a-20N monitor and regulate the power delivered to loads 22a-22N. As described in more detail with respect to FIG. 3, in one embodiment, SSPRs 20a-20N regulate the power delivered to loads 22a-22N by modulating the solid-state switching device On and Off at a frequency greater than the output frequency of wild-source generator 16.

Figure 2:
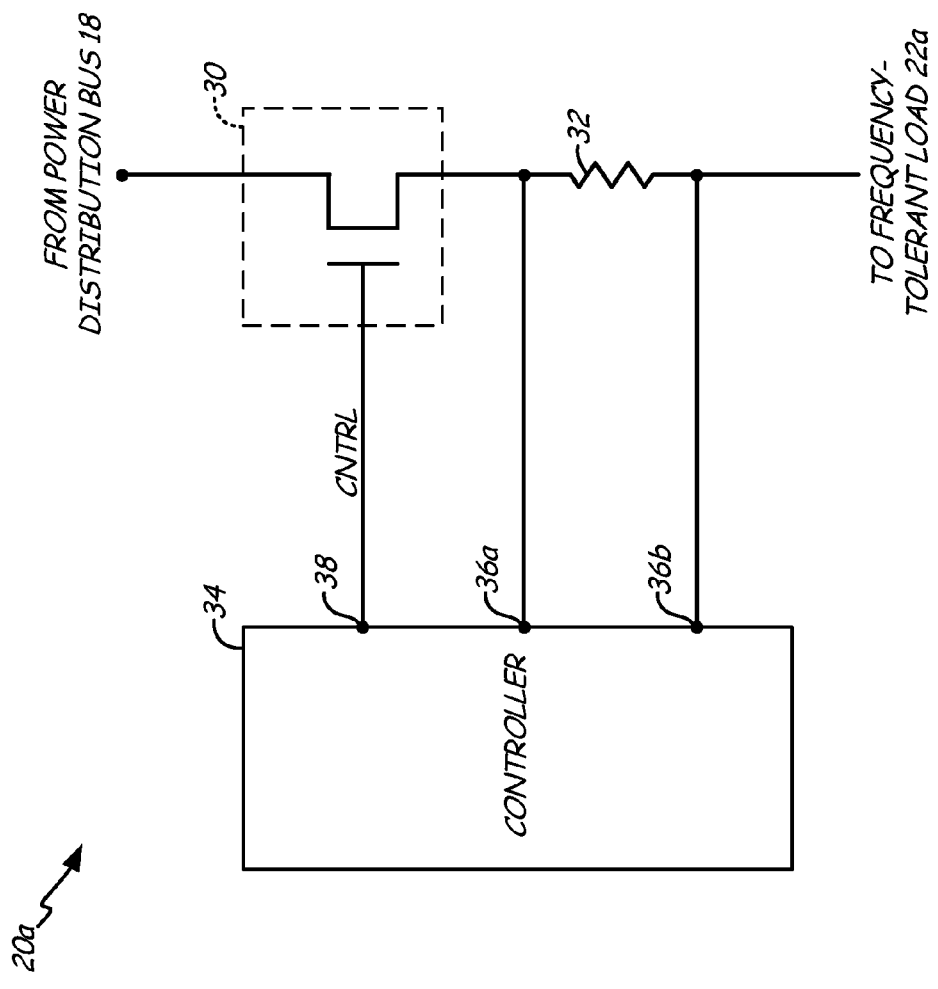
FIG. 2 is a block diagram of a solid-state power regulator (SSPR) employed in an EPGDS to regulate power supplied by a "wild" source to a load according to an embodiment of the present invention.

FIG. 2 is a block diagram of solid-state power regulator (SSPR) 20a employed in EPGDS 10 to regulate power supplied by wild-source generator 16 to frequency-tolerant load 22a according to an embodiment of the present invention.

SSPR 20a includes solid-state switching device 30, current-sense resistor 32 and controller 34. Solid-state switching device 30 includes a control terminal (e.g., gate) and first and second controlled terminals (e.g., source and drain). Controller 34 provides an input to the control terminal of solid-state switching device 30 to selectively turn the device On and Off. When On, input power received at a first controlled terminal from power distribution bus 18 is supplied to load 22a via the second controlled terminal. When Off, input power received at the first controlled terminal is prevented from being supplied to load 22a. In the embodiment shown in FIG. 2 solid-state switching device is a metal-oxide semiconductor field-effect transistor (MOSFET) although other well-known solid-state devices may be employed depending on the application. In particular, the solid-state device selected must be capable of communicating large amounts of power (e.g., greater than 15 amperes), and be capable of high-speed switching necessary to regulate the power delivered to load 22a. For example, in one embodiment solid-state switching device 30 is implemented with silicon carbide (SiC) transistors.

Controller 34 monitors and regulates the power delivered to load 22a. In variable frequency applications, in which the frequency of the power supplied to the loads is within a defined range, the power delivered to each load can be calculated or closely estimated based on the monitored current. However, the range of frequencies provided by wild-source generators makes it difficult to accurately monitor power delivered to the load based on monitored current alone. Controller 34 therefore monitors both current and voltage supplied to load 22a to determine the power delivered to load 22a.

In the embodiment shown in FIG. 2, controller 34 monitors the current by measuring the voltage across current-sense resistor 32 via input terminals 36a, 36b. In addition, controller 34 monitors the voltage provided to load 22a by monitoring the voltage at either input terminal 36a or input terminal 36b. In other embodiments, controller 34 includes additional input terminals for monitoring the voltage independent of the input terminals used to monitor the current. To ensure accurate measurement of the power delivered to load 22a, rapid sampling of the voltage and current is employed (e.g., sampling rate of more than twenty times the frequency of the wild-source generator 16. Based on the monitored voltage and current, controller 34 calculates the power supplied to load 22a and regulates the supply of power by selectively turning solid-state switching device 30 On and Off via a control signal provided at output terminal 38 to the gate of solid-state switching device 30. In one embodiment, controller 34 employs a pulse-width modulation (PWM) switching scheme to control the On/Off times of solid-state switching device 30 to regulate power supplied to load 22a. The switching frequency of solid-state switching device 30 is greater than the frequency of the wild-source supplied to load 22a. More specifically, to ensure regulation of the power supplied to the load, a switching frequency of more than five times the frequency of the wild-source generator 16 is employed by controller 34.

Figure 3:
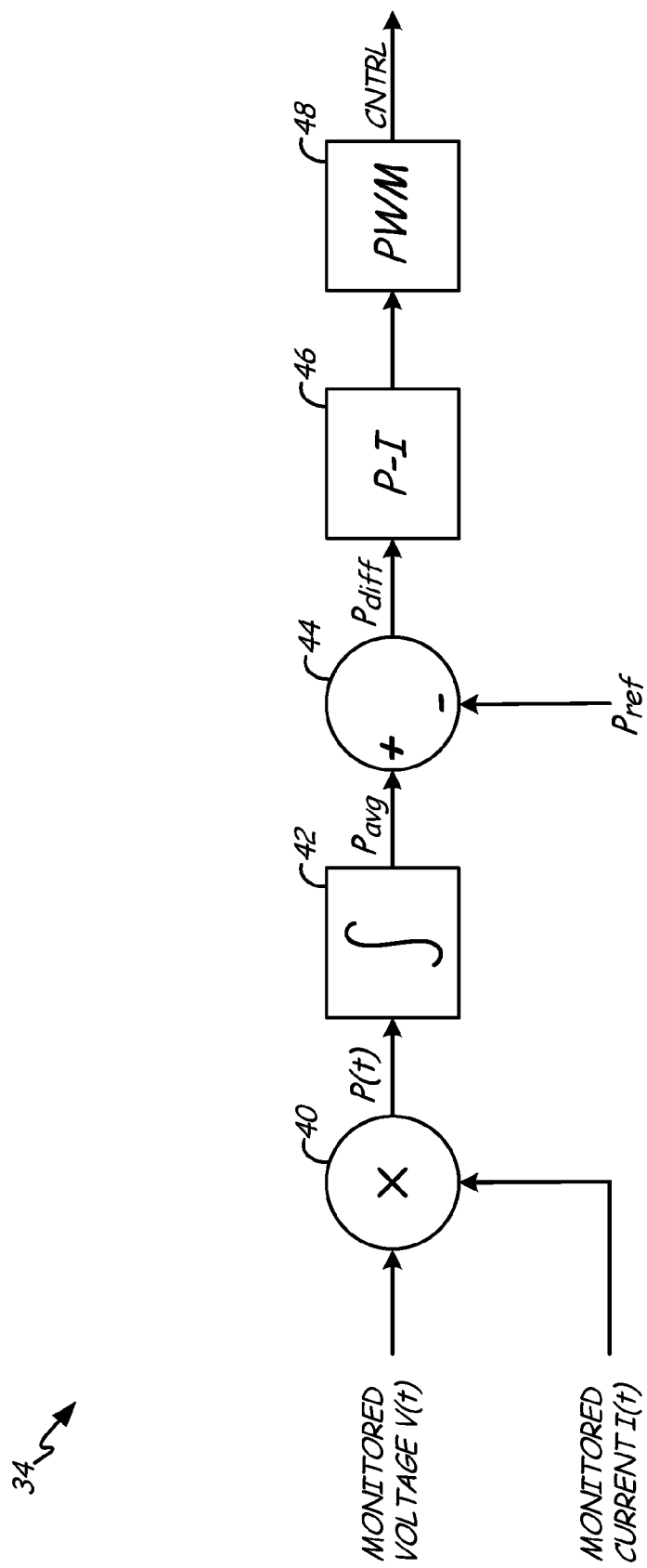
FIG. 3 is a block diagram of functions performed by a controller employed by a SSPR to regulate power delivered to the load according to an embodiment of the present invention.

FIG. 3 is a block diagram of functions performed by a controller employed by a SSPR to regulate power delivered to the load according to an embodiment of the present invention. These functions may be implemented by a microcontroller executing software to implement the desired function, by analog and/or digital circuitry, or a combination thereof.

Controller 34 receives a monitored voltage V(t) and monitored current I(t) as inputs. Controller 34 calculates the instantaneous power P(t) delivered to load 22a by multiplying the monitored voltage V(t) with the monitored current I(t) at multiplier 40. The instantaneous power P(t) is integrated over a defined period of time (e.g., one cycle on the output provided by wild-source generator 16) by integrator 42 to calculate an average power Pavg delivered to load 22a.

Controller 34 calculates the difference or error Pdiff between the average power delivered to load 22a and the reference power Pref (i.e., the desired power to deliver to load 22a) at block 44 by taking the difference between the average power Pavg and the reference power Pref. The difference Pdiff is used to calculate whether more or less power should be applied to load 22a. In the embodiment shown in FIG. 3, proportional-integral (P-I) controller 46 generates an output to minimize the difference between the average power Pavg and the reference power Pref. The output of P-I controller 46 is provided to pulse-width modulation (PWM) generator 48, which generates a PWM control signal (labeled 'CNTRL') that is supplied to the gate of solid-state switching device 30 to selectively control the supply of power to load 22a. In other embodiments, controller 34 may employ other control schemes to regulate the monitored power to a desired value.

In this way, the present invention employs wild-source generators to supply power to various frequency-tolerant loads within a power distribution system. Power supplied to the loads is regulated via solid-state power regulator (SSPRs), which include a controller and a solid-state power device turned On and Off to control the delivery of power to the load. The controller monitors power delivered to the load and modulates the On/Off time of the solid-state power device to regulate the power delivered to the load. Although described with respect to an aircraft application, the present invention may be employed in other applications in which wild-source generators are used to deliver power to frequency-tolerant loads.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A solid-state power regulator (SSPR) for regulating power delivered to a frequency tolerant load from a wild-source generator, the SSPR comprising:
   a solid-state switching device that delivers alternating current power from the wild-source power source to the frequency-tolerant load when On and prevents the delivery of power from the wild-source power source to the frequency-tolerant load when Off; and
   a controller connected to monitor current delivered to the frequency-tolerant load and voltage applied to the frequency-tolerant load, wherein the controller calculates power delivered to the frequency-tolerant load by calculating instantaneous power delivered to the frequency-tolerant load and calculating an average power delivered to the frequency-tolerant load, and the controller selectively turns the solid-state switching device On and Off to regulate alternating current power delivered to the frequency-tolerant load.

2. The SSPR of claim 1 wherein the controller selectively modulates the solid-state switching device to minimize the difference between the average power delivered to the frequency-tolerant load and a desired power.

3. The SSPR of claim 2 wherein the controller employs pulse-width modulation (PWM) to modulate the solid-state switching device.

4. The SSPR of claim 1 wherein the solid-state switching device is a silicon carbide (SiC) transistor.

5. An electric power generation and distribution system (EPGDS) for comprising:
- a wild-source generator that generates a wild-source output;
- a frequency-tolerant load;
- a solid-state power regulator (SSPR) having a solid-state switching device and a controller, wherein the controller monitors alternating current power delivered to the frequency-tolerant load from the wild-source generator by calculating instantaneous power delivered to the frequency-tolerant load and calculating an average power delivered to the frequency-tolerant load, and the controller modulates the solid-state switching device to regulate the alternating current power delivered to the frequency-tolerant load.

6. The EPGDS of claim 5 wherein the frequency-tolerant load is a resistive load.

7. The EPGDS of claim 5 wherein the controller calculates the average power delivered to the frequency-tolerant load based on the calculated instantaneous power and modulates the solid-state switching device to regulate the average power delivered to the frequency-tolerant load.

8. The EPGDS of claim 7, wherein the controller selectively modulates the solid-state switching device to minimize a difference between the average power delivered to the frequency-tolerant load and a desired power.

9. The EPGDS of claim 5, wherein the controller employs pulse-width modulation (PWM) to modulate the solid-state switching device.

10. The EPGDS of claim 5, wherein the solid-state switching device is a silicon carbide (SiC) transistor.

* * * * *